US012785749B2

(12) United States Patent
Burnight et al.

(10) Patent No.: US 12,785,749 B2
(45) Date of Patent: Nov. 3, 2026

(54) WIRELESS TRANSCEIVER RESYNCHRONIZATION OPTIONS

(71) Applicant: Texas Instruments Incorporated, Dallas, TX (US)

(72) Inventors: Alexis Justine Burnight, Dallas, TX (US); Ariton E. Xhafa, Plano, TX (US); Ramanuja Vedantham, Frisco, TX (US); Jesus Daniel Torres Bardales, Plano, TX (US); Vishal Coelho, Flower Mound, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 19/054,124

(22) Filed: Feb. 14, 2025

(65) Prior Publication Data

US 2025/0192819 A1 Jun. 12, 2025

Related U.S. Application Data

(63) Continuation of application No. 17/524,505, filed on Nov. 11, 2021, now Pat. No. 12,231,161.

(51) Int. Cl.

| | |
|---|---|
| ***H04B 1/7156*** | (2011.01) |
| ***H04B 1/3805*** | (2015.01) |
| ***H04W 72/0453*** | (2023.01) |

(52) U.S. Cl.

CPC ......... *H04B 1/7156* (2013.01); *H04B 1/3805* (2013.01); *H04W 72/0453* (2013.01); *H04B 2001/71563* (2013.01)

(58) Field of Classification Search

CPC .... H04B 1/3805; H04B 1/713; H04B 1/7156; H04B 2001/71563; H04B 2201/71384; H04W 56/0015; H04W 72/0453

See application file for complete search history.

(56) References Cited

U.S. PATENT DOCUMENTS

| | | | | |
|---|---|---|---|---|
| 6,005,884 A * | 12/1999 | Cook | H04B 7/2606 | 455/550.1 |
| 10,703,211 B2 | 7/2020 | Chuang | | |
| 2004/0239497 A1 | 12/2004 | Schwartzman et al. | | |
| 2006/0146914 A1* | 7/2006 | Horvath | H04B 1/713 | 375/E1.033 |
| 2008/0159355 A1 | 7/2008 | Rengert | | |

(Continued)

OTHER PUBLICATIONS

Anwar, IEEE 802.15.4E LLDN: Superframe Configuration for Networked Control System (Year: 2014).

(Continued)

*Primary Examiner* — David B Lugo

(74) *Attorney, Agent, or Firm* — Carl G. Peterson; Frank D. Cimino

(57) ABSTRACT

A communication circuit includes network formation circuitry configured to establish a wireless network between a primary wireless transceiver and a secondary wireless transceiver. The communication circuit also includes data transfer circuitry configured to perform data transfers between the primary wireless transceiver and the secondary wireless transceiver. The communication circuit further includes resynchronization circuitry configured to resynchronize the secondary wireless transceiver with the established wireless network within a target time interval.

20 Claims, 7 Drawing Sheets

(56) References Cited

U.S. PATENT DOCUMENTS

| | | | |
|---|---|---|---|
| 2011/0150042 | A1 | 6/2011 | Liu |
| 2018/0249431 | A1* | 8/2018 | Marvel ............... H04W 56/001 |
| 2018/0290556 | A1 | 10/2018 | Demont |
| 2019/0237816 | A1 | 8/2019 | Kim et al. |
| 2019/0265304 | A1 | 8/2019 | Kim et al. |
| 2019/0273293 | A1 | 9/2019 | Kim et al. |
| 2019/0363815 | A1 | 11/2019 | Bogenberger et al. |
| 2021/0043983 | A1 | 2/2021 | Choi et al. |
| 2021/0045109 | A1 | 2/2021 | Lee et al. |
| 2021/0281988 | A1 | 9/2021 | Han et al. |
| 2021/0319877 | A1 | 10/2021 | Teng |
| 2021/0377894 | A1 | 12/2021 | Kamath |
| 2022/0113356 | A1 | 4/2022 | Kasselman et al. |
| 2022/0179001 | A1 | 6/2022 | Park |
| 2022/0368364 | A1 | 11/2022 | Martinez et al. |
| 2022/0398256 | A1 | 12/2022 | Hartline |
| 2022/0417792 | A1 | 12/2022 | Winder et al. |

OTHER PUBLICATIONS

Vija, Enabling Robust Wireless Communication for BMS on electric Vehicle (Year: 2021).

* cited by examiner

WIRELESS TRANSCEIVER RESYNCHRONIZATION OPTIONS

BACKGROUND

As new electronic devices are developed and integrated circuit (IC) technology advances, new IC products are commercialized. One example IC product for electronic devices is a communication circuit with a wireless transceiver. There are many different wireless communication protocols and related wireless transceivers to support different ranges of wireless data transfer, different levels of security, frequencies used, and/or other variations. In some systems, wireless transceivers may be added to simplify wiring and facilitate replacement or repair of subsystem components/modules. For example, there are systems with a controller and multiple subsystems, where the controller and each of the subsystems need to communicate with each other. Use of wires between the controller and each subsystem as well as wires between subsystems is problematic when space is limited. Such wires make installation, removal, and/or replacement of each subsystem more challenging (e.g., the wires related to each subsystem need to be connected during installation, disconnected when servicing/removing, and reconnected after servicing/removing, which is difficult when space is limited). In this example, the addition of wireless transceivers would simplify the wiring between the controller and the subsystems and/or the wiring between the subsystems with the above-noted benefits. However, the addition of wireless transceivers may prevent compliance with safety standards of a system.

One example system that could benefit from wireless transceivers is an electric vehicle with a battery management system (BMS), resulting in a wireless BMS (WBMS). However, according to standard ISO 26262, battery monitoring devices need to provide Automotive Safety Integrity Level D (ASIL-D). There are two solutions for ASIL-D compliance: 1) the battery monitoring device can use separate measurement chains for temperature, voltage, and other events; or 2) the battery monitoring device can have built in tests to ensure that the probability of a failure meets the standard's requirements. In either instance, data must be transferred between a main controller and the subsystems of the WBMS within a certain time interval to ensure the safety of the system. The current standard specifies this interval as less than 100 ms. If a wireless transceiver loses synchronization with an established network, the probability of non-compliance with such safety standards increases.

SUMMARY

In at least one example, a communication circuit comprises network formation circuitry configured to establish a wireless network between a primary wireless transceiver and a secondary wireless node. The communication circuit also comprises data transfer circuitry configured to perform data transfers between the primary wireless transceiver and the secondary wireless transceiver. The communication circuit further comprises resynchronization circuitry configured to resynchronize the secondary wireless transceiver with the established wireless network within a target time interval.

In another example, a system comprises: a primary wireless transceiver adapted to be coupled to a controller of the system; and a secondary wireless transceiver adapted to be coupled to a subsystem of the system. The primary wireless transceiver and the secondary wireless transceiver are configured to establish a wireless network. The secondary wireless transceiver is configured to: identify a resynchronization trigger; and perform resynchronization with the established wireless network within a target time interval in response to the identified resynchronization trigger.

In yet another example, a method is performed by a communication circuit between a controller and a subsystem. The method comprises: establishing a wireless network with another communication circuit to transfer data between the controller and the subsystem; identifying a resynchronization trigger; and performing resynchronization with the established wireless network within a target time interval in response to the identified resynchronization trigger.

BRIEF DESCRIPTION OF THE DRAWINGS

The same reference number is used in the drawings for the same or similar (either by function and/or structure) features.

DETAILED DESCRIPTION

Figure 1:
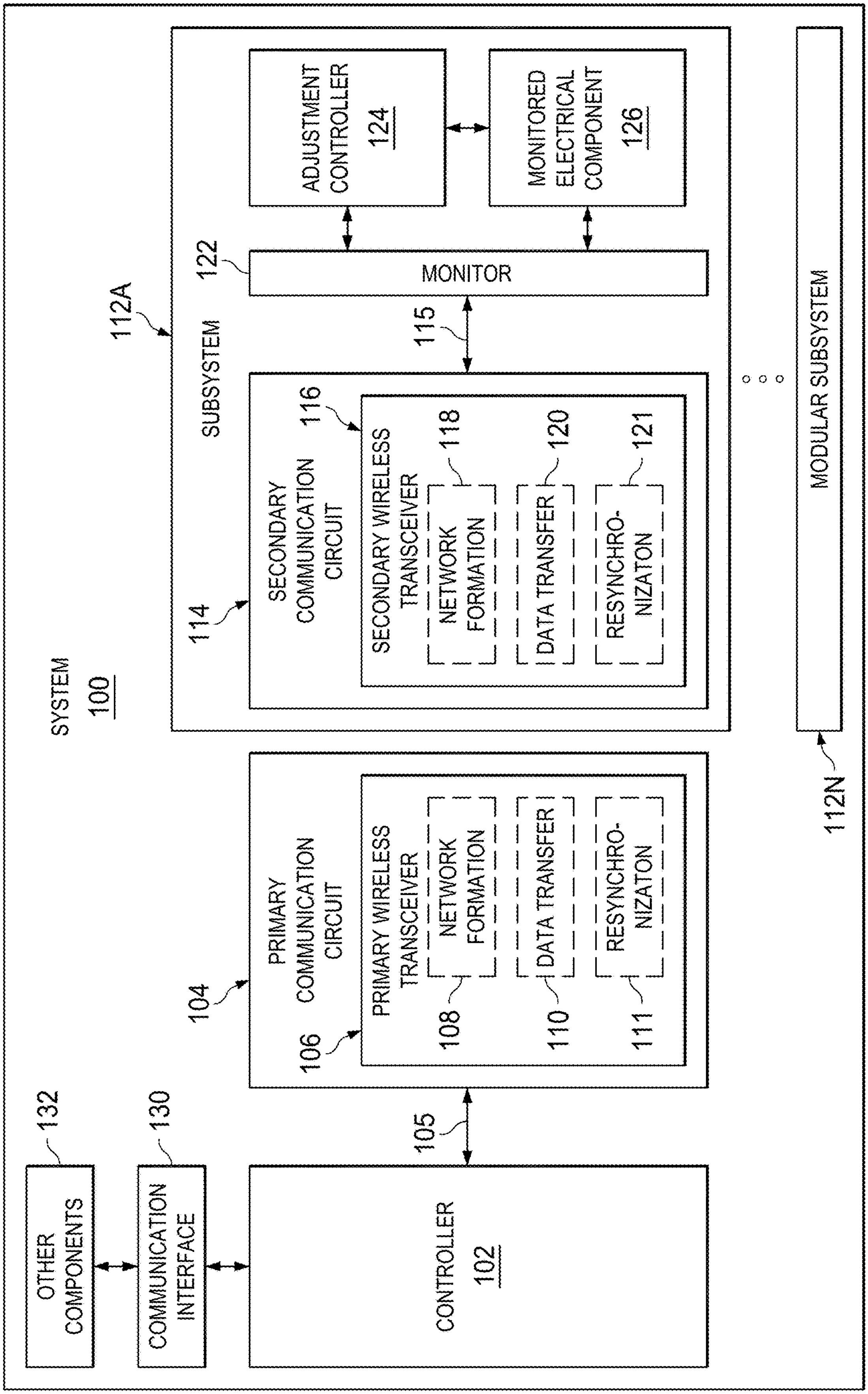
FIG. 1 is a block diagram of a system in accordance with an example embodiment.

Some example embodiments include a communication circuit with a wireless transceiver configured to perform resynchronization with an established wireless network as needed. The communication circuit may be an integrated circuit (IC) or other circuit. In some example embodiments, the wireless transceiver is part of a system with a controller in communication with subsystems via communication circuits that support wireless communications. In some example embodiments, the system includes a primary wireless transceiver and secondary wireless transceivers. The primary wireless transceiver is in communication with the controller (e.g., via a wired coupling), while each secondary wireless transceiver is in communication with a respective subsystems (e.g., via respective wired couplings). In operation, the primary wireless transceiver and the secondary wireless transceivers are configured to establish a wireless network and transfer data to each other as needed. Each secondary wireless transceiver is also configured to: identify a resynchronization trigger; and perform resynchronization with the established wireless network within a target time interval in response to the identified resynchronization trigger. The resynchronization options vary depending on whether a given secondary wireless transceiver is in an active wireless transceiver state (sometimes referred to herein as an active state) or a reset wireless transceiver state (sometimes referred to herein as a reset state).

In one example embodiment, the system is an electric vehicle and the communication circuits are part of a wireless subsystem management system such as a wireless battery management system (WBMS). For a WBMS, the primary wireless transceiver is part of a primary communication circuit included with a battery management unit (BMU) of the WBMS. The BMU includes, for example, a printed circuit board (PCB) with the controller and the primary communication circuit coupled via a wired coupling. Also, each secondary communication circuit is part of a respective cell monitor unit (CMU) of the WBMS. Each CMU includes, for example, a PCB with a respective secondary communication circuit and a respective monitor circuit coupled via a wired coupling. Each CMU may additionally include other components such as an adjustment controller to adjust operations of a monitored electrical component (e.g., a rechargeable battery). Each CMU is thus configured to monitor a monitored electronic component, provide data to the BMU, receive adjustment control signals or instructions back from the BMU, and adjust a respective monitored electronic component based on the adjustment instructions.

With the resynchronization options described herein, the communication circuits for a system with a controller and subsystems provide a wireless interface to facilitate wiring, replacement, and/or repair of the subsystems. In some example embodiments, each of the subsystems has similar components (e.g., a PCB, a communication circuit that supports wireless communications, and other components coupled to the communication circuit) and functionality. For example, in a WBMS, each of the subsystems includes a respective PCB with a communication circuit and a CMU configured to perform monitoring and/or adjustments with regard to a respective battery cell. Without limitation to their particular functionality, individual subsystems or related modules are replaceable in some example embodiments (i.e., the subsystems or related modules are modular in that they can be easily attached, detached, and/or replaced as needed). Together, the controller and the subsystems of a WBMS control charging of multiple battery cells (e.g., coupled in series and/or in parallel) and detect if a particular battery cell or related subsystem is not working properly. In some example embodiments, wireless communications between a controller and the subsystems of a system comply with a target time interval. Without limitation, the target time interval may be related to a safety standard (e.g., an automotive safety standard).

FIG. 1 is a block diagram of a system 100 in accordance with an example embodiment. In some example embodiments, the system 100 is an electric vehicle with battery management subsystems, or another system with subsystems. As shown, the system 100 includes a controller 102 in communication with subsystems 112A-112N via wireless communication channels (not shown). To support such communications between the controller 102 and the subsystems 112A-112N, the controller 102 is coupled via a wired coupling 105 to a primary communication circuit 104. The controller 102 is also coupled to other components 132 of the system 100 via a communication interface 130. The communication interface 130 may be a controller area network (CAN) or other communication interface. Also, each of the subsystems 112A-112N includes a respective secondary communication circuit 114 in communication with the primary communication circuit 104 via respective wireless communication channels. As shown for the subsystem 112A, the secondary communication circuit 114 is coupled to a respective monitor circuit 122 via a wired coupling 115. The controller 102 is this able to communicate with each respective monitor circuit 122 of the subsystems 112A-112N and vice versa via a combination of wired and wireless communications. Such communications may be for battery management system (BMS) operations or management of another type of monitored electrical component 126.

Adding wireless communications to the system 100 using the primary communication circuit 104 and each secondary communication circuit 114 facilitates repair and/or replacement of some or all of the components of the subsystems 112A-112N. However, such wireless communications may introduce unacceptable delays if synchronization between a primary wireless transceiver 106 of the primary communication circuit 104 and a secondary wireless transceiver 116 of a given secondary communication circuit 114 is lost. Accordingly, in the example of FIG. 1, the primary communication circuit 104 and/or each secondary communication circuit 114 is configured to perform resynchronization operations within a target time interval as needed (e.g., if synchronization with an established network is lost). With the resynchronization operations, wireless data transfers between the controller 102 and each of the subsystems 112A-112N (via the primary communication circuit 104 and each secondary communication circuit 114) are supported, while ensuring these wireless data transfers are performed within a target time interval even if synchronization is lost.

In operation, each of the subsystems 112A-112N uses its respective monitor circuit 122 to monitor parameters of a monitored electrical component 126. In some example embodiments, the monitored electrical component 126 is a rechargeable battery. Without limitation, the monitored parameters may include a voltage across the monitored electrical component 126 and/or a current through the monitored electrical component 126. The monitored parameters (or related values) are transferred to the controller 102, which analyses the monitored parameters (or related values) and determines whether any adjustments are needed. If adjustments are needed for a given subsystem, the controller 102 provides adjustment control signals to the given subsystem. As shown, each of the subsystems 112A-112N includes a respective adjustment controller 124, which is configured to adjust operations of a respective monitored electrical component 126 based on any adjustment control signals received from the controller 102.

In some example embodiments, the primary communication circuit 104 is an IC with a primary wireless transceiver 106. The primary wireless transceiver 106 includes circuitry and related programming/instructions to support a wireless network stack. As shown, the primary wireless transceiver 106 includes network formation circuitry 108 configured to establish a wireless network between the primary wireless transceiver 106 in communication with the controller 102 and a secondary wireless transceiver (e.g., the secondary wireless transceiver 116 in FIG. 1) in communication with or part of a given subsystem. The primary wireless transceiver 106 also includes data transfer circuitry 110 configured to perform data transfers between the primary wireless transceiver 106 and a secondary wireless transceiver (e.g., the secondary wireless transceiver 116 in FIG. 1). As shown, the primary wireless transceiver 106 further includes resynchronization circuitry 111. The resynchronization circuitry 111 is configured to support resynchronization of a secondary wireless transceiver (e.g., the secondary wireless transceiver 116 in FIG. 1) with an established wireless network within a target time interval.

In the example of FIG. 1, the secondary communication circuit 114 may be an IC that includes the secondary wireless transceiver 116. The secondary wireless transceiver 116 includes circuitry and related programming/instructions to support a wireless network stack. As shown, the secondary wireless transceiver 116 includes network formation circuitry 118 configured to establish a wireless network between the secondary wireless transceiver 116 in communication with a given monitor circuit 122 and the primary wireless transceiver 106 in communication with the controller 102. As another option, the secondary wireless transceivers of different subsystems may communicate wirelessly with each other as part of an established wireless network. The secondary wireless transceiver 116 also includes data transfer circuitry 120 configured to perform data transfers between the secondary wireless transceiver 116 and the primary wireless transceiver 106. As another option, data transfers occur between the secondary wireless transceivers of different subsystems.

As shown, the secondary communication transceiver 116 further includes the resynchronization circuitry 121. The resynchronization circuitry 121 is configured to resynchronize the secondary wireless transceiver 116 with an established wireless network within a target time interval. Example resynchronization operations include identifying if the secondary communication transceiver 116 is in an active state or a reset state. If the secondary communication transceiver 116 is in the active state, resynchronization options may include using a configuration channel or data channel within a frequency hopping schema of the established wireless network to resynchronize the secondary wireless transceiver with the established wireless network. If the secondary wireless transceiver 116 is in the reset state, resynchronization options may include: scanning multiple channels within a frequency hopping schema of the established wireless network to identify an active channel; and resynchronizing the secondary wireless transceiver 116 with the established wireless network based on the identified active channel.

In some example embodiments, resynchronization circuitry (e.g., the resynchronization circuitry 121) is configured to: identify the secondary wireless transceiver as being in an active state or a reset state; and if the secondary wireless transceiver is identified as being in an active state, use a configuration channel within a frequency hopping schema of the established wireless network to resynchronize the secondary wireless transceiver with the established wireless network. In such example embodiments, the resynchronization circuitry is configured to: switch to a next available configuration channel within the frequency hopping schema in response to the secondary wireless transceiver losing synchronization with the established wireless network; and wait in a receive mode at the next available configuration channel until a next packet is received from the primary wireless transceiver.

In some example embodiments, resynchronization circuitry (e.g., the resynchronization circuitry 121) is configured to: identify the secondary wireless transceiver as being in an active state or a reset state; and if the secondary wireless transceiver is identified as an active state, use a data channel within a frequency hopping schema of the established wireless network to resynchronize the secondary wireless transceiver with the established wireless network. In such example embodiments, resynchronization circuitry is configured to: estimate a number of missed superframes of the established wireless network in response to the secondary wireless transceiver losing synchronization with the established wireless network; and use the estimated number of missed superframes to resynchronize the secondary wireless transceiver with the established wireless network. A superframe is discussed below.

In some example embodiments, resynchronization circuitry (e.g., the resynchronization circuitry 121) is configured to: identify the secondary wireless transceiver as being in an active state or a reset state; if the secondary wireless transceiver is identified as being in a reset state, scan multiple channels within a frequency hopping schema of the established wireless network to identify an active channel; and resynchronize the secondary wireless transceiver with the established wireless network based on the identified active channel. In such example embodiments, the resynchronization circuitry is configured to scan all channels within the frequency hopping schema within the target time interval. As another option, scanning the channels within a frequency hopping schema of the established wireless network to identify an active channel may be performed when the secondary wireless transceiver is identified as being in an active state.

Figure 2:
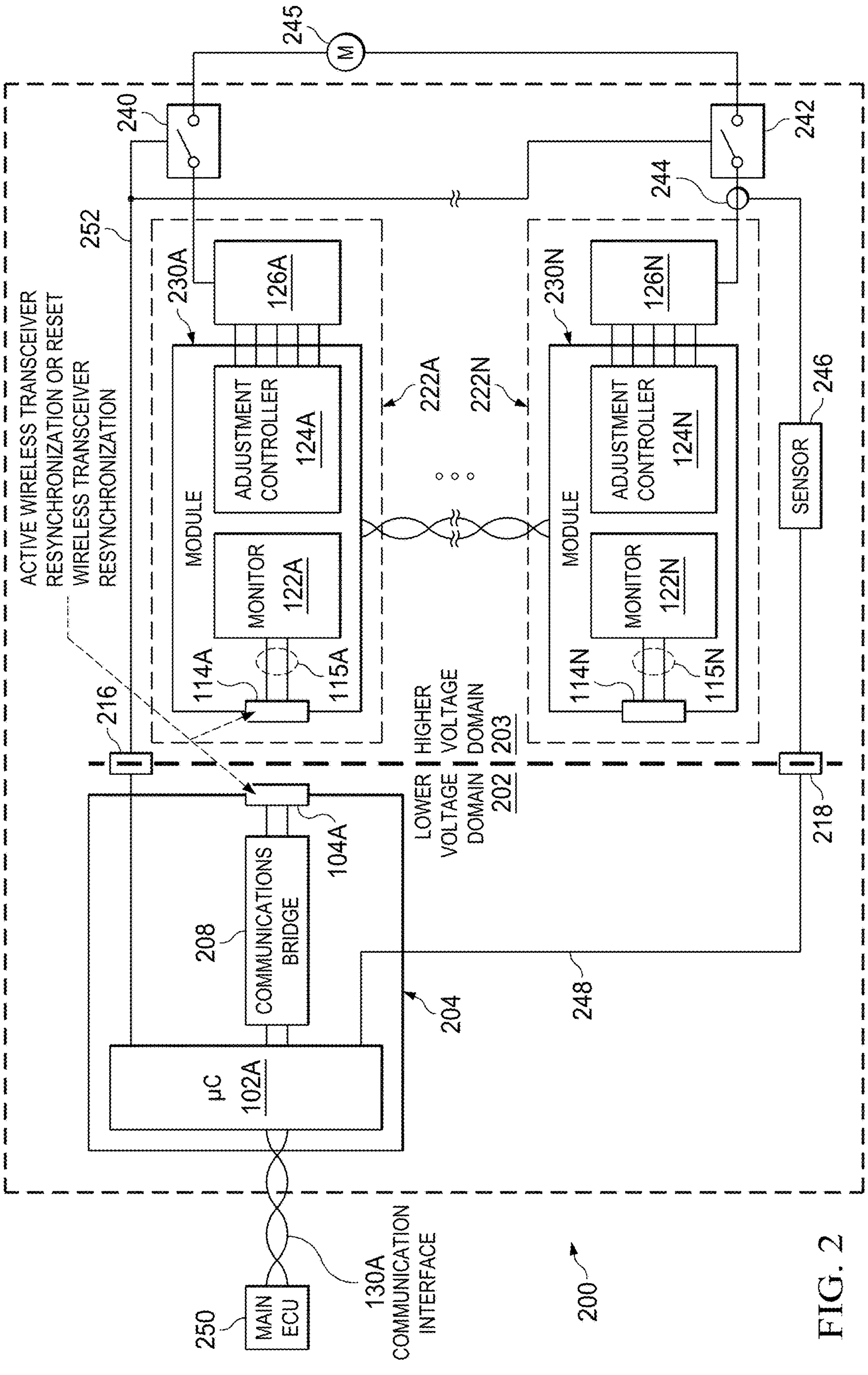
FIG. 2 is a block diagram of another system in accordance with another example embodiment.

FIG. 2 is a block diagram of another system 200 in accordance with an example embodiment. With the system 200, wireless management of subsystems 222A-222N (examples of the subsystems 112A-112N in FIG. 1) is provided with resynchronization options within a target time interval as described herein. In FIG. 2, the system 200 includes a lower voltage domain 202 (e.g., 12, 24, or 48 volts) with control circuitry 204. Meanwhile, the subsystems 222A-222N are in a higher voltage domain 203 (e.g., several hundreds of volts) compared to the control circuitry 204. As shown, the control circuitry 204 includes a microcontroller 102A (an example of the controller 102 in FIG. 1) and a primary communication circuit 104A (an example of the primary communication circuit 104 in FIG. 1). The control circuitry 204 may also include a communications bridge 208 between the microcontroller 102A and the primary communication circuit 104A. In the example of FIG. 2, a main electronic control unit (ECU) 250 for the system 200 is coupled to the control circuitry 204 via a communication interface 130A (an example of the communication interface 130 in FIG. 1). In operation, the primary communication circuit 104A is configured to perform primary wireless transceiver operations, including resynchronization operations for an active wireless transceiver and/or a reset wireless transceiver as described herein.

As shown, the subsystem 222A includes a module 230A. The module 230A may include a PCB with a secondary communication circuit 114A (an example of the secondary communication circuit 114 in FIG. 1), a monitor circuit 122A (an example of the monitor circuit 122 in FIG. 1), and an adjustment controller 124A (an example of the adjustment controller 124 in FIG. 1). The module 230A is coupled to a monitored electrical component 126A (an example of the monitored electrical component 126 in FIG. 1). The subsystems 222B-222N each include a respective module 230B-230N coupled to a respective monitored electrical component 126B-126N. In some example embodiments, the monitored electrical components 126A-126N are rechargeable batteries or other components with a variable status. Without limitation, each the modules 230B-230N include the same type of components (e.g., a secondary communication circuit, a monitor circuit, and an adjustment controller) as the module 230A.

In FIG. 2, the secondary communication circuit 114A is configured to perform secondary wireless transceiver operations, including active wireless transceiver resynchronization operations and/or reset wireless transceiver resynchronization operations as described herein. Also, the monitored electronic components 126A-126N may be coupled together to provide a combined function. As shown, the system 200 includes switches 240, 242, and component 245. In some example embodiments, the component 245 is a motor/engine. In this case, closing the circuit at switches 240 and 242 results in current flowing through the engine/motor to operate a vehicle. When the vehicle is parked or turned off, the switches 240 and 242 are open. In the example of FIG. 2, the switches 240 and 242 are controlled by a control signal 252 from the microcontroller 102A. The control signal 252 is conveyed to the switches 240 and 242, for example, via interface 216. In the example of FIG. 2, the microcontroller 102A may also receive a current sense signal 248 via interface 218, where the current sense signal 248 is generated from a loop 244 or related sensor 246.

In operation, the primary communication circuit 104A is configured to send data to and receive data from the microcontroller 102A via a wired coupling (e.g., the communications bridge 208). The primary communication circuit 104A is also configured to send data to and receive data from one or more of the secondary communication circuits 114A-114N via respective wireless communication channels (not shown). In some example embodiments, resynchronization operations are performed as needed. As an example, the primary communication circuit 104A may support configuration channels within a frequency hopping schema of an established wireless network. Such configuration channels enable secondary communication circuits that lose synchronization with an established wireless network to resynchronize within a target time interval.

Also, each of the secondary communication circuit 114A-114N is configured to send data to and receive data from a respective monitor circuit 122A-122N via a respective wired couplings 115A-115N (examples of the wired coupling 115 in FIG. 1). Each of the secondary communication circuits 114A-114N is also configured to send data to and receive data from the primary communication circuit 104A and/or another of the secondary communication circuits 114A-114N via wireless communication channels (not shown). In some example embodiments, resynchronization operations as performed as needed by one or more of the secondary communication circuits 114A-114N. Without limitation, example resynchronization operations include identifying if a secondary wireless transceiver is in an active state or a reset state. If the secondary wireless transceiver is in the active state, resynchronization options may include using a configuration channel or data channel within a frequency hopping schema of the established wireless network to resynchronize the secondary wireless transceiver with the established wireless network. If the secondary wireless transceiver is in the reset state, resynchronization options may include: scanning multiple channels within a frequency hopping schema of the established wireless network to identify an active channel; and resynchronizing the secondary wireless transceiver with the established wireless network based on the identified active channel.

Figure 3A:
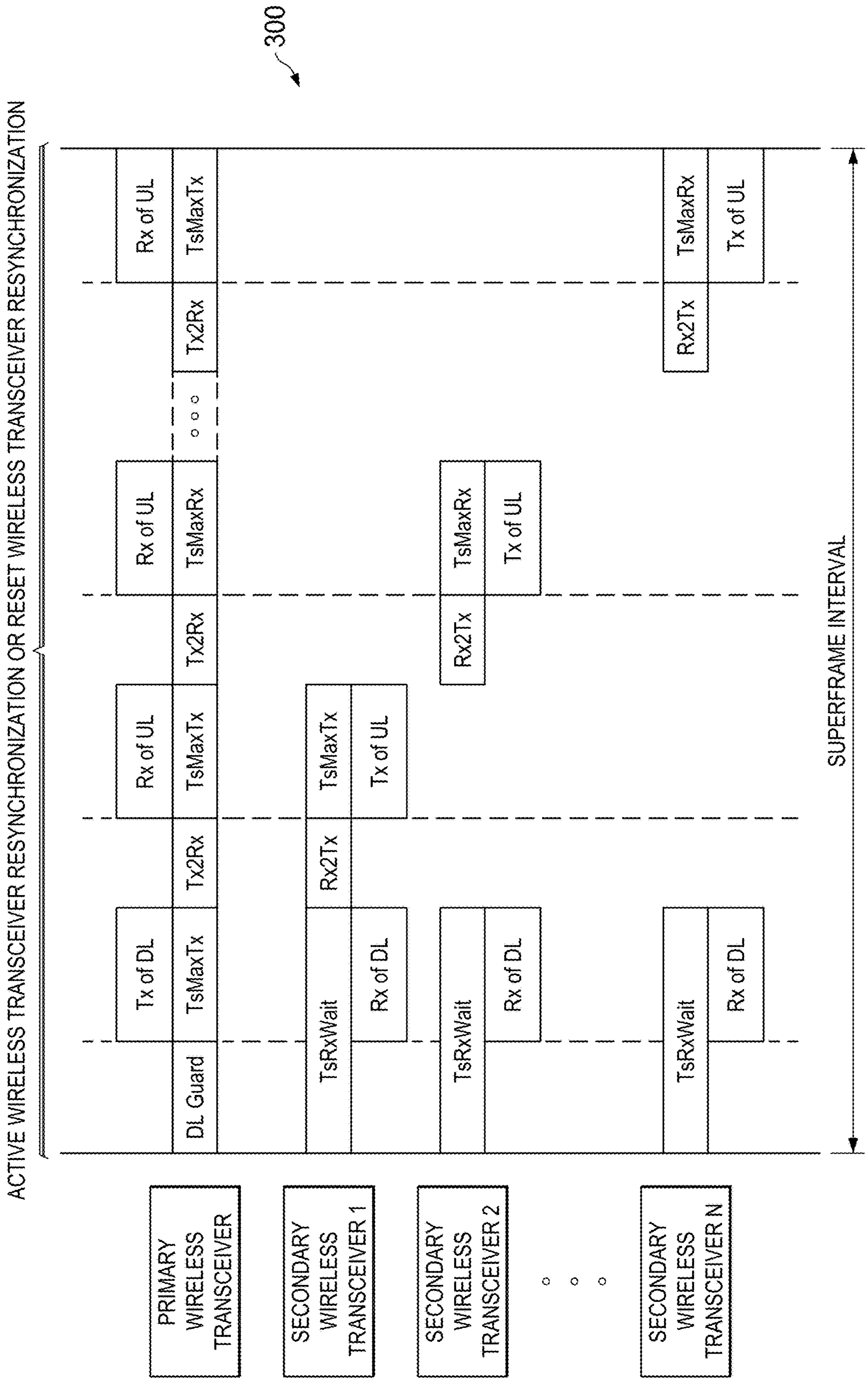
FIG. 3A is a diagram of a wireless management network protocol in accordance with an example embodiment.

FIG. 3A is a diagram of a wireless management network protocol 300 in accordance with an example embodiment. The protocol 300 supports data transfers between a primary wireless transceiver (e.g., the primary wireless transceiver 106 in FIG. 1) and secondary wireless transceivers (each secondary wireless transceiver 116 in FIG. 1) in a system (e.g., the system 100 in FIG. 1, or the system 200 in FIG. 2) with managed subsystems.

In FIG. 3A, time is divided into slots and the primary wireless transceiver transmits packets in the downlink (DL) slot, while the secondary wireless transceivers transmit their packets in respective uplink (UL) slots. The time interval that includes a single DL slot (for the primary wireless transceiver to transmit packets) and all UL slots (for each secondary wireless transceivers to transmit packets) is called a superframe interval. In the wireless management network protocol 300, one superframe is represented. Over time, the wireless management network protocol 300 may use a plurality of such superframes (one superframe after another superframe, etc.) to support data transfers between: 1) a primary wireless transceiver and a secondary wireless transceiver; or 2) a secondary wireless transceiver and another secondary wireless transceiver. While FIG. 3A shows data communications involving multiple secondary wireless transceivers, there are scenarios (e.g., in a scanning/joining phase) when only the primary wireless transceiver and a single secondary wireless transceiver exchange information that is needed for the secondary wireless transceiver to join a network.

In the wireless management network protocol 300, resynchronization operations are performed as needed. Without limitation, example resynchronization operations include identifying if a secondary wireless transceiver is in an active state or a reset state. If the secondary communication transceiver is in the active state, resynchronization options may include using a configuration channel or data channel within a frequency hopping schema of the established wireless network to resynchronize the secondary wireless transceiver with the established wireless network. If the secondary wireless transceiver is in the reset state, resynchronization options may include: scanning multiple channels within a frequency hopping schema of the established wireless network to identify an active channel; and resynchronizing the secondary wireless transceiver with the established wireless network based on the identified active channel.

An overview of some example resynchronization options is now given. First, a secondary wireless transceiver can be in one of two states, an active state or a reset state, when synchronization is lost. Since the conditions surrounding these two states vary, they are treated as separated events with different resynchronization procedures.

Active device resynchronization occurs when the following conditions are met: 1) the secondary wireless transceiver is in an active state (i.e., the secondary wireless transceiver was not been reset); 2) a wireless network between the primary wireless transceiver and the secondary wireless transceiver has already been established; 3) the wireless network is assumed to still be active (i.e. the primary wireless transceiver is still transmitting to the secondary wireless transceivers); 4) the secondary wireless transceiver has maintained the frequency hopping schema of the established wireless network; and 5) the secondary wireless transceiver has lost synchronization with the primary wireless transceiver (i.e., no other errors have occurred).

One active wireless transceiver resynchronization option is to use configuration channels. For this option, a frequency hopping schema is selected by the primary wireless transceiver and a related frequency hopping table or other data structure is distributed to the secondary wireless transceivers during network formation. Since the configuration channels are a small subspace of the available channels, one resynchronization option inserts the configuration channels in the frequency hopping schema. For example, in the WBMS protocol, there are 40 total channels split into 37 data channels and 3 configuration channels. Therefore, after the frequency hopping table is generated by the primary wireless transceiver using only the data channels, the configuration channels are inserted at even spaces into the frequency hopping schema as shown in FIG. 3B.

Figure 3B:
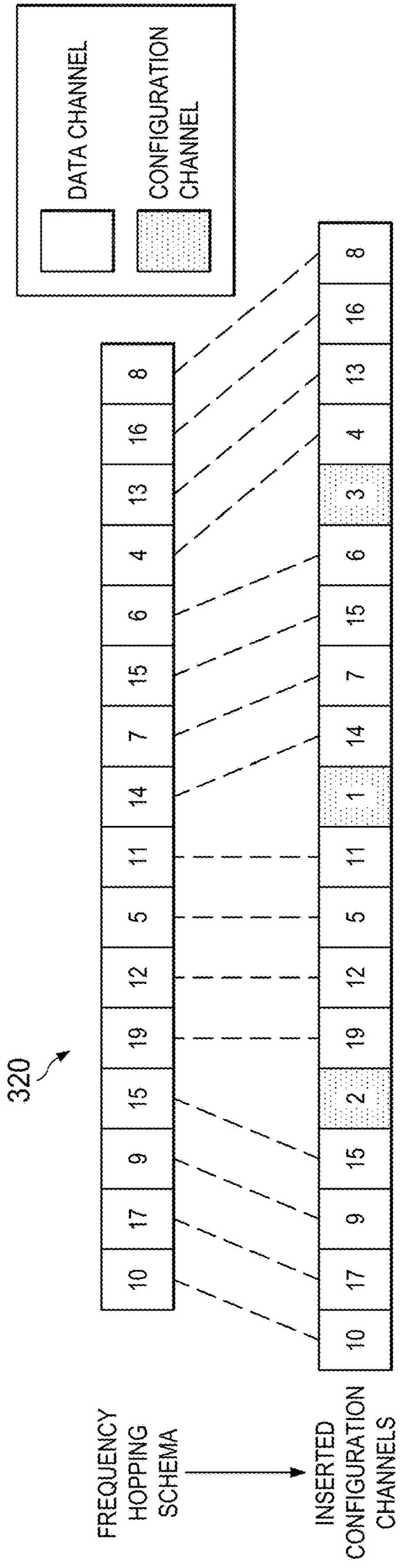
FIG. 3B is a diagram of transceiver resynchronization using configuration channels in accordance with an example embodiment.

FIG. 3B is a diagram 320 of transceiver resynchronization using configuration channels in accordance with an example embodiment. In the example of FIG. 3B, a configuration channel is inserted at every fifth index of the frequency hopping schema. When a secondary wireless transceiver loses synchronization, the secondary wireless transceiver will switch to the next configuration channel and wait in receive mode until the next packet is received from the primary wireless transceiver. However, if the secondary wireless transceiver loses synchronization in the last data channel before a configuration channel, the drift may cause the secondary wireless transceiver to miss the resynchronization packet. Therefore, the secondary wireless transceiver may switch to the subsequent configuration channel if needed. Using FIG. 3B as an example, if a secondary wireless transceiver loses synchronization while in data channel 9, the secondary wireless transceiver will wait in configuration channel 2. However, if the secondary wireless transceiver loses synchronization in data channel 15, the secondary wireless transceiver will skip configuration channel 2 and will wait in configuration channel 1 to receive the next packet from the primary wireless transceiver.

In some example embodiments, the maximum resynchronization delay is given as:

$$\text{maximum delay} = t_{sf}\,(T_{CC} + 1) \quad (1)$$

where $T_{CC}$ is the period of the configuration channels and $t_{sf}$ is the superframe time. The maximum delay is thus proportional to the frequency of configuration channels in the frequency hopping schema. However, if the configuration channels are used by other wireless devices they could suffer from increased interference. Additionally, if the configuration channels are only used for resynchronization, inserting the configuration channels into the frequency hopping schema also creates dead time for the synchronized wireless transceivers and data transmission delays. The next resynchronization option addresses the potential limitations of using configuration channels in the frequency hopping schema for resynchronization.

Another active wireless transceiver resynchronization option is to use data channels of the frequency hopping schema for resynchronization. With this option, configuration channels are not needed for resynchronization. Instead, a secondary wireless transceiver maintains the time elapsed ($t_{elapsed\_since\_sync}$) since the last primary wireless transceiver packet was received. In some example embodiments, the value of $t_{sync}$ as well as $t_{sf}$ and the maximum drift ($t_{max\_drift}$) are used to approximate the total drift ($t_{total\_drift}$) as:

$$t_{total\_drift} = \frac{t_{max\_drift}}{t_{sf}} * t_{elapsed\_since\_sync} \quad (2)$$

In some example embodiments, $t_{total\_drift}$ is used to approximate the number of missed superframes ($n_{sf}$) as well as the next frequency ($channel_{next}$) that a secondary wireless transceiver should use for resynchronization. More specifically, $n_{sf}$ may be calculated as:

$$n_{sf} = \frac{t_{total\ drift} + t_{elapsedSincesync}}{t_{sf}} \quad (3)$$

In some example embodiments, $channel_{next}$ is calculated as:

$$channel_{next} = \text{frequency hopping table}\,[\text{index of}\,(channel_{last}) + n_{sf})] \quad (4)$$

Accordingly, the maximum delay is based on $t_{total\_drift}$ and the number of missed superframes before a secondary wireless transceiver begins resynching. For example, assuming $t_{total\_drift}$ is less than one superframe and two missed packets from the primary wireless transceiver triggers a secondary wireless transceiver to start resynchronization, the maximum delay would be three superframes. This second resynchronization approach decreases the amount of dead time in the frequency hopping schema and has a faster resynchronization time compared to using configuration channels for resynchronization.

In some example embodiments, reset wireless transceiver resynchronization is performed when the following conditions are met: 1) the secondary wireless transceiver has been reset; 2) communication between the primary wireless transceiver and the secondary wireless transceiver has already been established; 3) the established network is assumed to still be active (i.e., the primary wireless transceiver is still transmitting to the secondary wireless transceivers); and 4) the secondary wireless transceivers retained the network configuration from the last connection.

Using the previous network information, a reset secondary wireless transceiver can intelligently scan through multiple channels during each superframe to determine the active channel and resynchronize to the established network. The scan time is defined as the amount of time the lost secondary wireless transceiver needs to scan a channel to determine if the network is active on that channel. To determine the active channel, the following information may be stored in memory (e.g., non-volatile memory): the frequency hopping schema, $t_{sf}$, and the guard time ($t_{guard}$) before the primary wireless transceiver transmits at the beginning of each superframe. In some example embodiments, $t_{guard}$ along with the symbol rate ($d_s$), the number of preamble symbols ($s_p$), the number of syncword symbols ($s_s$), and a buffer time ($t_{buffer}$) are used to calculate the scan time ($t_{scan}$) as:

$$t_{scan} = t_{guard} + d_s\,(s_p + s_S) + t_{buffer} \quad (5)$$

In some example embodiments, a lost secondary wireless transceiver will scan through the channels using the frequency hopping schema information stored in memory. The number of channels ($n_{channels}$) that can be scanned in one superframe is based on $t_{scan}$ and the size of the superframe. In some example embodiments, $n_{channels}$ is calculated as:

$$n_{channels} = \frac{t_{sf}}{t_{scan}} \quad (6)$$

The maximum number of superframes ($n_{sf}$) it takes for a reset wireless transceiver to resynchronize to the established network depends on the number of data channels ($n_{data}$) that can be scanned during each superframe. In some example embodiments, $n_{sf}$ is calculated as:

$$n_{sf} = \frac{n_{data}}{n_{channels}} + 1 \quad (7)$$

For example, if 10 channels can be scanned in one superframe and there are 20 data channels, then the reset secondary wireless transceiver will resynchronize to the established network within three superframes. This approach allows a reset secondary wireless transceiver to resynchronize with an established network in a decreased number of superframes and this enables the network to continue operating while complying with the target time interval.

Figure 4:
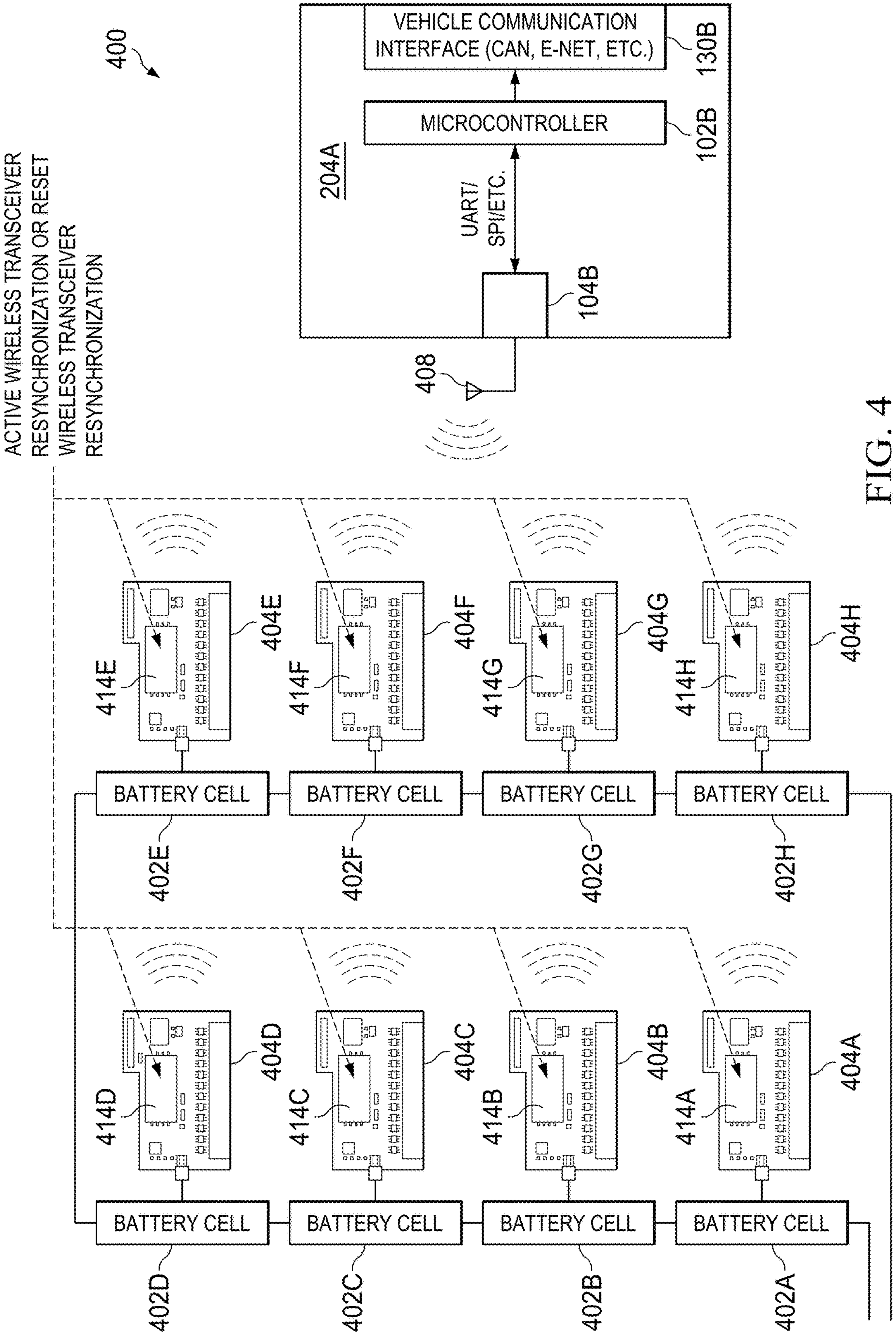
FIG. 4 is a diagram of a Wireless Battery Management System (WBMS) in accordance with an example embodiment.

FIG. 4 is a diagram of a WBMS 400 in accordance with an example embodiment. As shown, the WBMS 400 includes battery cells 402A-402H (e.g., Li-ion cells) in series. Each of the battery cells 402A-402H is coupled to a respective module 404A-404H (examples of the modules 230A-230N in FIG. 2) to form respective subsystems (e.g., the battery cell 402A and the module 404A is an example of a subsystem as described herein). The modules 404A-404H may perform monitoring, adjustment, data transfers, and/or resynchronization operations as described herein.

In the example of FIG. 4, the WBMS 400 includes control circuitry 204A (an example of the control circuitry 204 in FIG. 2) with a microcontroller 102B (an example of the controller 102 in FIG. 1, or the microcontroller 102A in FIG. 2), a primary communication circuit 104B (an example of the primary communication circuit 104 in FIG. 1, or the primary communication circuit 104A in FIG. 2), and a communication interface 130B (an example of the communication interface 130 in FIG. 1, or the communication interface 130A in FIG. 2). In the example of FIG. 4, the microcontroller 102B and the primary communication circuit 104B communicate via a wired transceiver protocol such as a Universal Asynchronous Receiver-Transmitter (UART) protocol, a serial peripheral interface (SPI) protocol, or other wired transceiver protocol. Also, the communication interface 130B may be a vehicle communication interface such as a controller area network (CAN) interface, an Ethernet interface, or other communication interface. As shown, the control circuitry 204A is coupled to an antenna 408 for wireless communications with the modules 404A-404H. In operation, the primary communication circuit 104B is configured to perform wireless data transfers and resynchronization operations as described herein.

With the WBMS 400, the functionality of the battery cells 402A-402H is combined and the combined functionality of all of the battery cells 402A-402H is monitored and adjusted as needed. For example, the performance of the battery cells 402A-402H may degrade over time. In such case, adjustment or replacement of a specific one of the battery cells 402A-402H or other components of the modules 404A-404H may be needed. By using the primary communication circuit 104B and the secondary communication circuits 414A-414H for wireless data transfers between the microcontroller 102B and modules 404A-404H such replacement is facilitated while supporting monitoring, adjustment, status update, parameter transfer, and/or other operations related to the battery cells 402A-402H. The use of resynchronization operations with the WBMS 400 ensures wireless communications for battery management system operations comply with a target time interval (e.g., a safety standard). Without limitation, example resynchronization operations include identifying if a secondary wireless transceiver is in an active state or a reset state. If the secondary communication transceiver is in the active state, resynchronization options may include using a configuration channel or data channel within a frequency hopping schema of the established wireless network to resynchronize the secondary wireless transceiver with the established wireless network. If the secondary wireless transceiver is in the reset state, resynchronization options may include: scanning multiple channels within a frequency hopping schema of the established wireless network to identify an active channel; and resynchronizing the secondary wireless transceiver with the established wireless network based on the identified active channel.

Figure 5:
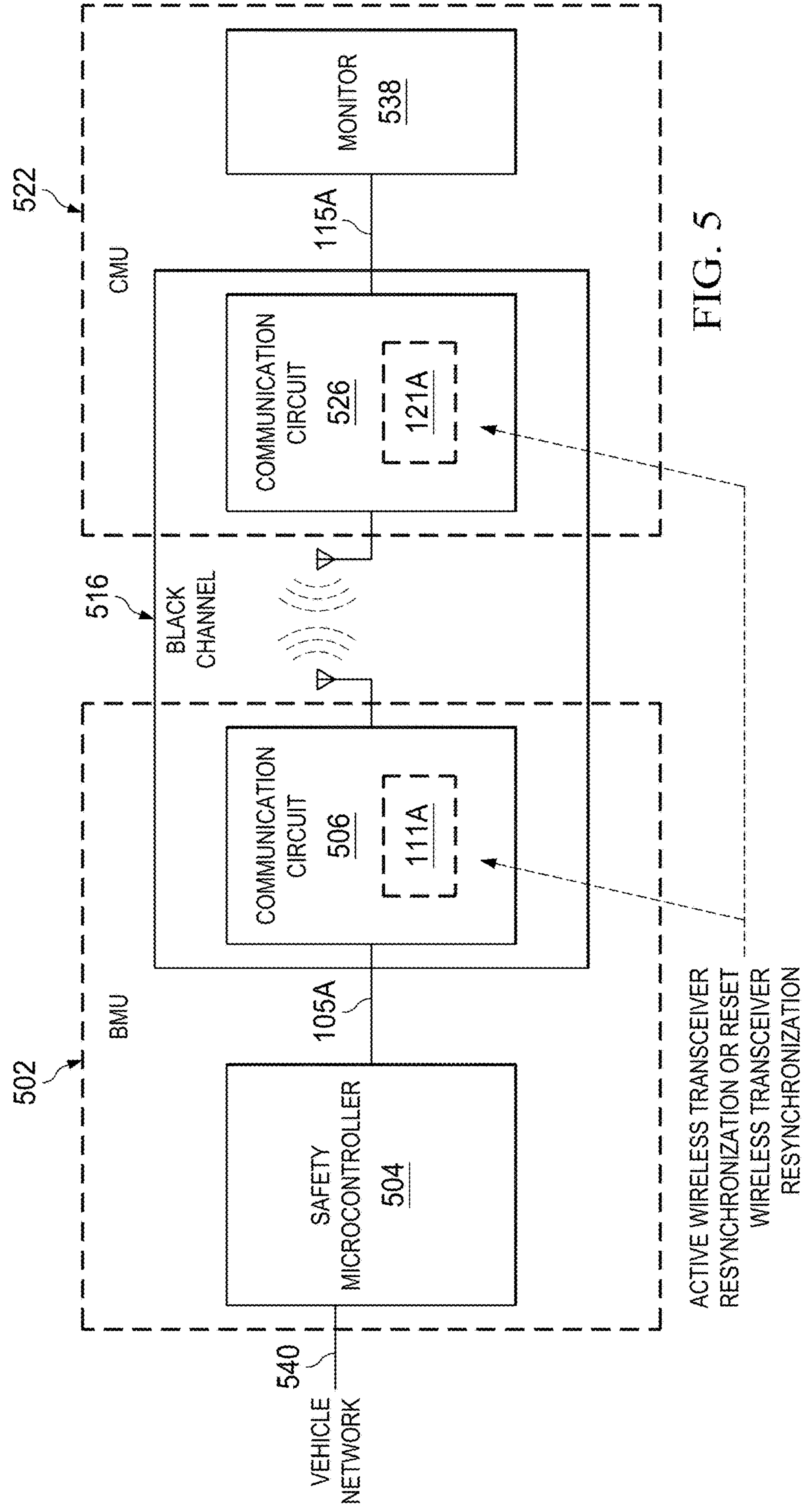
FIG. 5 is a block diagram of a battery management unit (BMU) and a cell monitoring unit (CMU) in accordance with an example embodiment.

FIG. 5 is a block diagram of a BMU 502 and a CMU 522 in accordance with an example embodiment. In some example embodiments, the BMU 502 and the MCU 522 are part of a BMS, such as a WBMS, for a system (e.g., the system 100 in FIG. 1, the system 200 in FIG. 2, or the WBMS 400 in FIG. 4). The MCU 502 may include, for example, a PCB or other unit with a safety microcontroller 504 (an example of the controller 102 in FIG. 1, the microcontroller 102A in FIG. 2, of the microcontroller 102B in FIG. 4) and a communication circuit 506 (e.g., the primary communication circuit 104 in FIG. 1, the primary communication circuit 104A in FIG. 2, or the primary communication circuit 104B in FIG. 4) coupled to each other via a wired coupling 105A (an example of the wired coupling 105 in FIG. 1). The microcontroller 504 is also coupled to a vehicle network via communication interface 540 (an example of the communication interface 130 in FIG. 1, the communication interface 130A in FIG. 2, or the communication interface 130B in FIG. 4).

In the example of FIG. 5, the communication circuit 506 includes resynchronization circuitry 111A (an example of the resynchronization circuitry 111 in FIG. 1). The communication circuit 506 may additionally include other components such as those described for the primary communication circuit 104 in FIG. 1. In some example embodiments, the communication circuit 506 is configured to perform the operations described for the primary communication circuit 104 in FIG. 1, the primary communication circuit 104A in FIG. 2, or the primary communication circuit 104B in FIG. 4.

The CMU 522 may include, for example, a PCB or other unit with a monitor circuit 538 (an example of the monitor circuit 122 in FIG. 1, or one of the monitor circuits 122A-122N in FIG. 2) and a communication circuit 526 (e.g., the secondary communication circuit 114 in FIG. 1, one of the secondary communication circuits 114A-114N in FIG. 2, or one of the secondary communication circuits 114A-114H in FIG. 4) coupled to each other via a wired coupling 115A (an example of the wired coupling 115 in FIG. 5).

In the example of FIG. 5, the communication circuit 526 includes resynchronization circuitry 121A (an example of the resynchronization circuitry 121 in FIG. 1). The communication circuit 526 may additionally include other components such as those described for the secondary communication circuit 114 in FIG. 1. In some example embodiments, the communication circuit 526 is configured to perform the operations of the secondary communication circuit 114 in FIG. 1, one of the secondary communication circuits 114A-114N in FIG. 2, or one of the secondary communication circuit 114A-114H in FIG. 4.

In the example of FIG. 5, the wireless connection between the communication circuits 506 and 526 is referred to as a black channel 516 because the wireless connection does not comply with standards of the safety microcontroller 504 and the monitor circuit 538. In order to ensure communications between the safety microcontroller 504 and the monitor circuit 538 comply with a communications latency standard, the communication circuit 506 includes the resynchronization circuitry 111A and the communication circuit 526 includes the resynchronization circuitry 121A. Without limitation, example resynchronization operations include identifying if a secondary communication transceiver is in an active state or a reset state. If the secondary communication transceiver is in the active state, resynchronization options may include using a configuration channel or data channel within a frequency hopping schema of the established wireless network to resynchronize the secondary wireless transceiver with the established wireless network. If the secondary wireless transceiver is in the reset state, resynchronization options may include: scanning multiple channels within a frequency hopping schema of the established wireless network to identify an active channel; and resynchronizing the secondary wireless transceiver with the established wireless network based on the identified active channel.

As another option, a secondary wireless transceiver in an active state may initiate resynchronization in response to missing a predefined number of primary wireless transceiver downlinks. As another option, a secondary wireless transceiver in a reset state may detect a start-up sequence after reset based on a valid non-volatile memory space. If the reset was manually triggered, a flag could be used to initiate resynchronization. As another option, if the reset was not manually triggered, the secondary wireless transceiver may scan the configuration channels within the frequency hopping schema of the established wireless network to detect if an active network formation sequence is ongoing. If not, the secondary wireless transceiver can switch to resynchronization using the data channels (e.g., based on received signal strength indication or "RSSI" sensing). If the secondary wireless transceiver then detects the correct channel and the primary wireless transceiver ID does not match, the second wireless transceiver may perform normal pairing operations.

In some example embodiments, a secondary wireless transceiver detects its reset state based on a valid non-volatile memory space. In a scenario where the non-volatile memory space of the secondary wireless transceiver is not valid, the primary wireless transceiver may eventually restart the network (e.g., after a prolonged duration, after an expected maximum time allowed for a secondary wireless transceiver to resynchronize, and/or after a command from the safety microcontroller).

Figure 6:
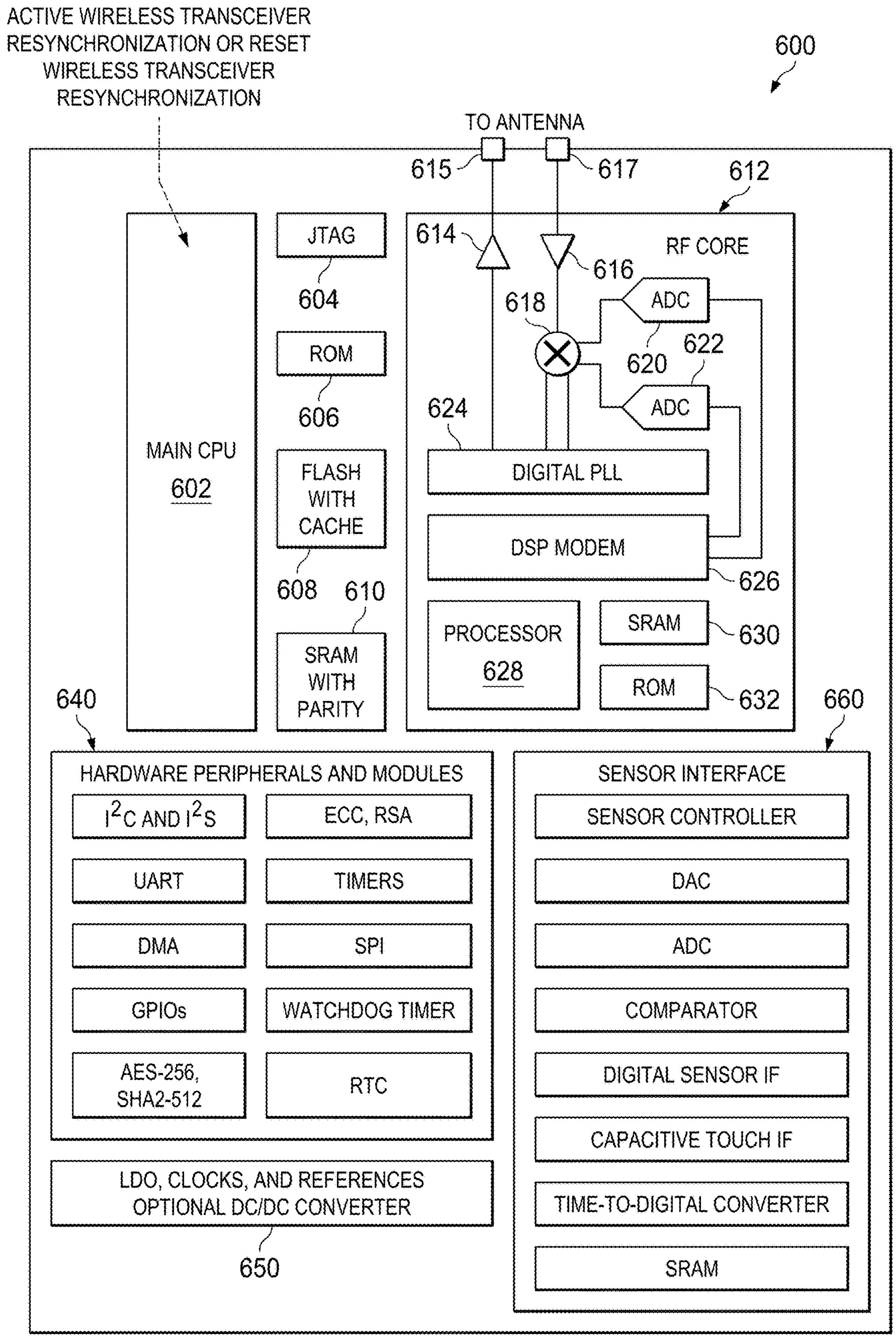
FIG. 6 is a diagram of a communication circuit in accordance with an example embodiment.

FIG. 6 is a diagram of a communication circuit 600 (an example of the primary communication circuit 104 in FIG. 1, the primary communication circuit 104A in FIG. 2, the primary communication circuit 104B in FIG. 4, the communication circuit 506 in FIG. 5, the secondary communication circuit 114 in FIG. 1, one of the secondary communication circuits 114A-114N in FIG. 2, one of the secondary communication circuits 114A-114H in FIG. 4, or the communication circuit 526 in FIG. 5) in accordance with an example embodiment. As shown, the communication circuit 600 includes a main central processing unit (CPU) 602, a Joint Test Action Group (JTAG) interface 604, read-only memory (ROM) 606, Flash memory 608, and static random-access memory (SRAM) 610.

The communication circuit 600 also includes a radio frequency (RF) core 612 (e.g., to provide the primary wireless transceiver 106 or the secondary wireless transceiver 116 in FIG. 1). In the example of FIG. 6, the RF core 612 includes a transit chain 614 and a receive chain 616 coupled to antenna terminals 615 and 617. The receive chain 616 is coupled to a sampler 618, which outputs samples of received data to analog-to-digital converters (ADCs) 620 and 622. The digitized samples are provided to a digital signal processor (DSP) modem 626. As shown, the transmit chain 614 and the sampler 618 are also coupled to a digital phase-locked loop (PLL) 624 to manage timing of receive operations and/or transmit operations. Other example components of the RF core 612 include a processor 628, SRAM 630, and ROM 632.

As shown, the communication circuit 600 also includes hardware peripherals and modules 640. Without limitation, examples of the hardware peripherals and modules 640 include: serial communications interfaces (e.g., $I^2C$, $I^2S$, SPI, etc.); one or more UARTs, a direct memory access (DMA) interface; general programmable input/outputs (GPIOs); an encryption module (e.g., AES-256); a hashing module (e.g., SHA2-512); timers; an error correction code (ECC) module; a cryptosystem module (e.g., RSA); a watchdog timer; and a real-time clock (RTC) module.

In the example of FIG. 6, the communication circuit 600 further includes circuitry 650 such as a low-dropout regulator (LDO), clocks, references, and a direct-current to direct-current (DC/DC) converter. In some example embodiments, the communication circuit 600 also includes a sensor interface 660 with various components to support sensor operations. Without limitation, example components of the sensor interface 660 include: a sensor controller; a digital-to-analog converter (DAC), an ADC, a comparator, a digital sensor interface (IF), a capacitive touch IF, a time-to-digital converter, and SRAM. With the communication circuit 600, a wired transceiver (e.g., the UART or SPI modules of the hardware peripherals and modules 640) and a wireless transceiver (e.g., the RF core 612) are configured to perform network formation, data transfer, and resynchronization as described herein.

In some example embodiments, a secondary wireless transceiver (e.g., the secondary wireless transceiver 116 in FIG. 1, or related components of the communication circuit 600 in FIG. 6) is configured to: identify a resynchronization trigger; and perform resynchronization with the established wireless network in response to the identified resynchronization trigger within a target time interval. In some example embodiments, if the secondary wireless transceiver is in as an active state, the secondary wireless transceiver is configured to use a configuration channel within a frequency hopping schema of the established wireless network to resynchronize with the established wireless network. In such embodiments, the secondary wireless transceiver is configured to: switch to a next available configuration channel within the frequency hopping schema in response to losing synchronization with the established wireless network; and wait in a receive mode at the next available configuration channel until a next packet is received from the primary wireless transceiver.

In some example embodiments, if the secondary wireless transceiver is in as an active state, the secondary wireless transceiver is configured to use a data channel within a frequency hopping schema of the established wireless network to resynchronize with the established wireless network. In such example embodiments, the secondary wireless transceiver is configured to: estimate a number of missed superframes of the established wireless network in response to losing synchronization with the established wireless network; and use the estimated number of missed superframes to resynchronize the secondary wireless transceiver with the established wireless network.

In some example embodiments, if the secondary wireless transceiver is in a reset state, the secondary wireless transceiver is configured to: scan multiple channels within a frequency hopping schema to identify an active channel; and resynchronize with the established wireless network based on the identified active channel. In such example embodiments, the secondary wireless transceiver is configured to scan all channels within the frequency hopping schema within the target time interval.

Figure 7:
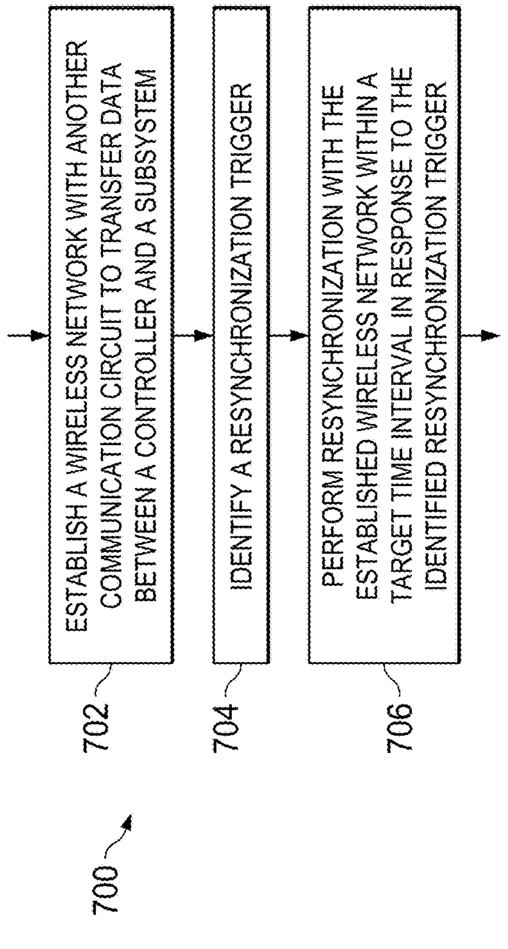
FIG. 7 is a flowchart of a communication circuit method in accordance with an example embodiment.

FIG. 7 is a flowchart of a communication circuit method 700 in accordance with an example embodiment. The method 700 is performed, for example, by a communication circuit (e.g., the primary communication circuit 104 in FIG. 1, the primary communication circuit 104A in FIG. 2, the primary communication circuit 104B in FIG. 4, the communication circuit 506 in FIG. 5, the secondary communication circuit 114 in FIG. 1, one of the secondary communication circuits 114A-114N in FIG. 2, one of the secondary communication circuits 114A-114H in FIG. 4, or the communication circuit 526 in FIG. 5) between a controller and a subsystem (see e.g., FIG. 1). As shown, the method 700 includes establishing a wireless network with another communication circuit to transfer data between the controller and the subsystem at block 702. At block 704, a resynchronization trigger is identified. At block 706, resynchronization with the established wireless network is performed within a target time interval in response to the identified resynchronization trigger.

In some example embodiments, performing resynchronization at block 706 includes: identifying an active wireless transceiver state; and in response to identifying the active wireless transceiver state, using a configuration channel within a frequency hopping schema of the established wireless network to resynchronize with the established wireless network. In such example embodiments, performing resynchronization may include switching to a next available configuration channel within the frequency hopping schema in response to losing synchronization with the established wireless network; and waiting in a receive mode at the next available configuration channel until a next packet is received from the primary wireless transceiver.

In some example embodiments, performing resynchronization at block 706 includes: identifying an active wireless transceiver state; and in response to identifying the active wireless transceiver state, using a data channel within a frequency hopping schema of the established wireless network to resynchronize with the established wireless network. In such example embodiments, performing resynchronization includes: estimating a number of missed superframes of the established wireless network in response to losing synchronization with the established wireless network; and using the estimated number of missed superframes to resynchronize the secondary wireless transceiver with the established wireless network.

In some example embodiments, performing resynchronization at block 706 includes: identifying a reset wireless transceiver state; in response to identifying the reset wireless transceiver state, scanning multiple channels within a frequency hopping schema to identify an active channel; and resynchronizing with the established wireless network based on the identified active channel. In such example embodiments, the secondary wireless transceiver is configured to scan all channels within the frequency hopping schema within the target time interval.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or IC package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Modifications are possible in the described embodiments, and other embodiments are possible, within the scope of the claims.

The invention claimed is:

1. A device comprising:

a transceiver; and a controller coupled to the transceiver and configurable to:

determine that the device is unsynchronized with a primary network node;

determine that a next communication channel is a first configuration channel in a frequency hopping schema; and wait at a second configuration channel after the first configuration channel in response to determining that the next communication channel is the first configuration channel.

2. The device of claim 1, wherein the second configuration channel follows the first configuration channel in the frequency hopping schema.

3. The device of claim 1, wherein the second configuration channel does not immediately follow the first configuration channel in the frequency hopping schema.

4. The device of claim 1, wherein the controller is configurable to:

determine that the device lost synchronization in a first data channel immediately before the first configuration channel in the frequency hopping schema; and wait at the second configuration channel after the first configuration channel in response to determining that the device lost synchronization in the first data channel immediately before the first configuration channel.

5. The device of claim 4, wherein the first configuration channel is a next available configuration channel after the first data channel.

6. The device of claim 1, wherein the controller is configurable to wait in receive mode at the second configuration channel until a next packet is received by the transceiver.

7. The device of claim 1, wherein the controller is configurable to:

determine that a next communication channel is a first data channel in the frequency hopping schema, wherein the first data channel is immediately before the first configuration channel in the frequency hopping schema; and wait at the first configuration channel in response to determining that the next communication channel is the first data channel.

8. The device of claim 7, wherein the first configuration channel is a next available configuration channel after the first data channel.

9. The device of claim 7, wherein the controller is configurable to determine that the device lost synchronization in a second data channel immediately before the first data channel in the frequency hopping schema.

10. A device comprising:

a transceiver; and a controller coupled to the transceiver and configurable to:

determine that the device lost synchronization with a primary network node in a first data channel immediately before a first configuration channel in a frequency hopping schema; and wait at a second configuration channel after the first configuration channel in the frequency hopping schema when the device lost synchronization with the primary network node in the first data channel.

11. The device of claim 10, wherein the controller is configurable to:

determine that the device lost synchronization with the primary network node in a second data channel immediately before the first data channel in the frequency hopping schema; and wait at the first configuration channel when the device lost synchronization with the primary network node in the second data channel.

12. The device of claim 10, wherein the second configuration channel follows the first configuration channel in the frequency hopping schema.

13. The device of claim 10, wherein the second configuration channel does not immediately follow the first configuration channel in the frequency hopping schema.

14. The device of claim 10, wherein the first configuration channel is a next available configuration channel after the first data channel.

15. The device of claim 10, wherein the controller is configurable to wait in receive mode at the second configuration channel until a next packet is received by the transceiver.

16. The device of claim 10, wherein the controller is configurable to:

determine that the device lost synchronization with the primary network node in a second data channel immediately before the first data channel in the frequency hopping schema; and wait at the first data channel when the device lost synchronization with the primary network node in the second data channel.

17. A method comprising:

determining that a secondary network device is unsynchronized with a primary network device;

determining that a next communication channel is a first configuration channel in a frequency hopping schema; and waiting at a second configuration channel after the first configuration channel in response to determining that the next communication channel is the first configuration channel.

18. The method of claim 17, wherein the second configuration channel follows the first configuration channel in the frequency hopping schema, and wherein the second configuration channel does not immediately follow the first configuration channel in the frequency hopping schema.

19. The method of claim 17, further comprising:

determining that the secondary network device lost synchronization in a first data channel immediately before the first configuration channel in the frequency hopping schema; and waiting at the second configuration channel after the first configuration channel in response to determining that the secondary network device lost synchronization in the first data channel immediately before the first configuration channel.

20. The method of claim 19, wherein the first configuration channel is a next available configuration channel after the first data channel.

* * * * *